Feb. 17, 1925.
A. E. GIBSON
1,526,332
APPARATUS FOR FORMING MOLDED OBJECTS
Original Filed May 3, 1922
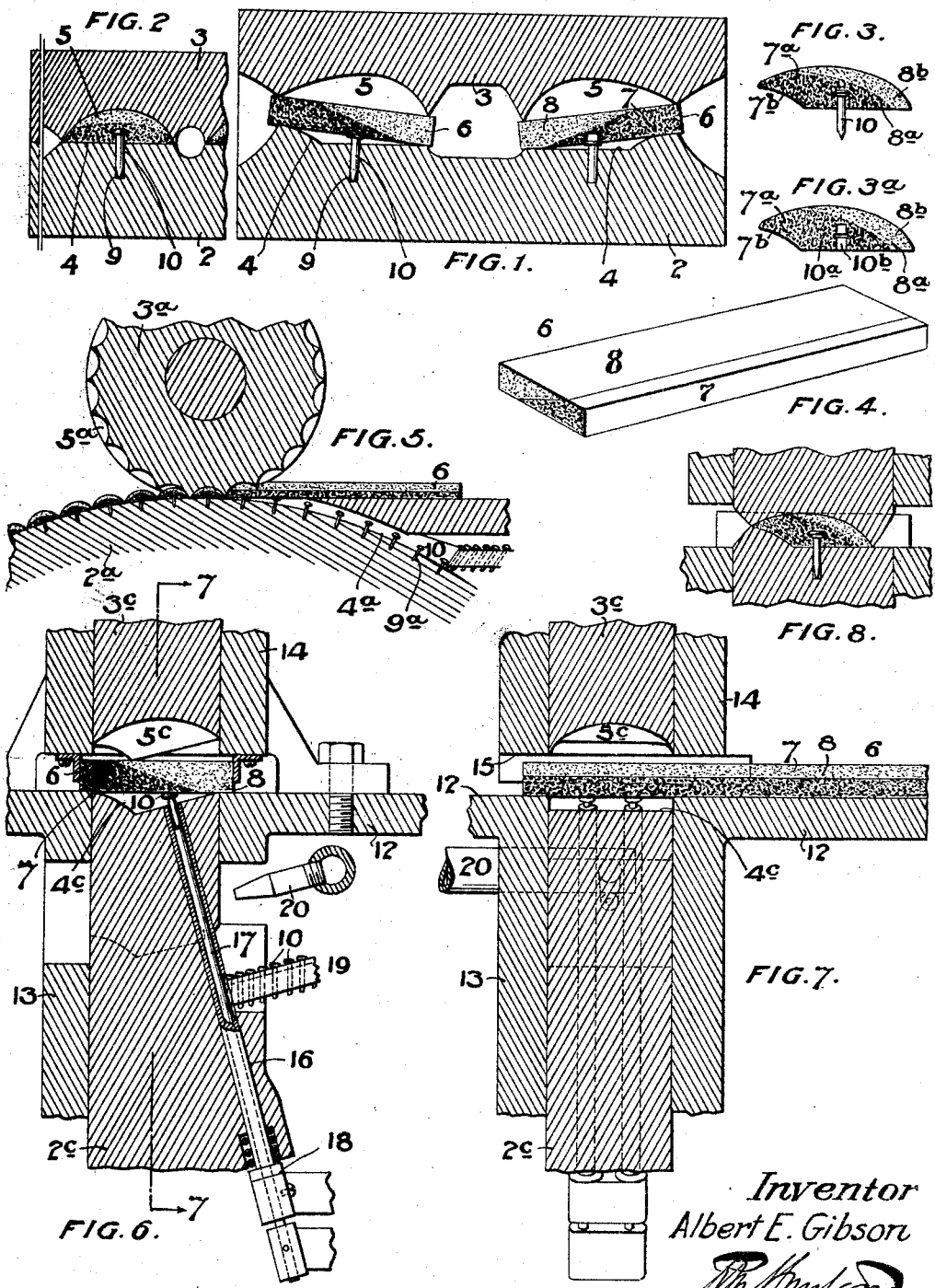
Inventor
Albert E. Gibson Patented Feb. 17, 1925.

1,526,332

UNITED STATES PATENT OFFICE.

ALBERT E. GIBSON, OF SPRINGFIELD, PENNSYLVANIA, ASSIGNOR TO THE DENTISTS' SUPPLY COMPANY, A CORPORATION OF NEW YORK.

APPARATUS FOR FORMING MOLDED OBJECTS.

Original application filed May 3, 1922, Serial No. 558,069. Divided and this application filed July 18, 1924. Serial No. 726,684.

*To all whom it may concern:*

Be it known that I, ALBERT E. GIBSON, a citizen of the United States, and resident of Springfield, county of Delaware, and State of Pennsylvania, have invented an Improvement in Apparatus for Forming Molded Objects, of which the following is a specification.

My invention has for its object the molding of artificial teeth and other articles in such a manner as to form them of two or more grades of material (such as of different colors) and which, when baked or vitrified, will provide a unitary object with different colors or shades blended to a more or less extent.

This application is a division of my application Serial Number 558,069, filed May 3, 1922, now Patent 1,511,458, issued Oct. 14, 1924, and relates to the apparatus disclosed therein.

In another pending application of mine, Serial Number 537,157, filed February 17, 1922, I have set out a process and apparatus for securing final results of the same general character as herein contemplated, but in that case the articles were made from mixtures of different materials in powdered or granular form fed into the molds in a loose condition and thereafter compressed to the proper shape and homogeneity in respect to density.

In the present case, the materials are first prepared in the form of sheets or strips in which the different shades or colors are incorporated with a uniformity along the length of the strip, the said strip being preferably slightly plastic and adapted to be subjected to stamping and molding operations, whereby a series of duplicated articles, such as artificial teeth, may be successively stamped from and formed of the said strip material, and wherein each article so formed is composed in its make-up of portions of the differently colored or shaded substance of the strip, said articles being in this respect substantially identical.

My object is further to provide a suitable machine or apparatus for stamping and forming the composite materials in the manner above stated though, in a more broad aspect of the invention, the forming or shaping of the articles, as for instance, artificial teeth, may be performed in the usual molds now employed when subjected to greater pressure than has hertofore been necessary in their use where the molds have been filled with plastic material by hand operation.

Considering the subject of this invention more particularly in respect to the making of artificial teeth, it is necessary to provide a porcelain body portion of relatively darker material than the front and incisor portion which are composed of lighter and more transparent porcelain. Heretofore the materials composing the light and dark portions of the teeth were first prepared in a more or less pasty condition and then introduced into the mold successively by hand, and subsequently compressed and baked preliminary to the final vitrifying operation. The process, as heretofore carried on, is relatively slow and, moreover, is liable to provide more or less irregularity and dissimilarity in the shading of the teeth when, on the other hand, they should be duplicates of each other.

By my improved means I am enabled to mold artificial teeth and other articles in a rapid manner from the previously prepared sheets or strips of the composite light and dark materials and at the same time insure absolute uniformity in the preparation and positions of the light and dark materials in the molding during the operation to secure the different coloring or shading of the article.

With the above and other objects in view, the nature of which will be more fully understood from the description hereinafter, the invention consists in the novel construction of apparatus, as hereinafter more fully described and defined in the claims.

Referring to the drawings: Fig. 1 is a vertical section through a mold and material to be treated thereby and embodying my invention; Fig. 2 is a transverse section of a portion of the means shown in Fig. 1, when the material has been subjected to pressure; Figs. 3 and 3ª are sectional views through artificial teeth molded by the method and means constituting my invention; Fig. 4 is a perspective view of a strip of the composite material from which the teeth or other articles are stamped and molded; Fig. 5 is a sectional view illustrating a type of machine for rapidly molding the articles from a strip of the character shown in Fig.

4; Fig. 6 is a vertical section of another type of machine adapted for stamping and molding the articles from the composite strip; Fig. 7 is a transverse section taken on line 7—7 of the apparatus shown in Fig. 6; and Fig. 8 is a sectional view with the dies in their completed movement for molding the tooth and showing a modified form of apparatus.

Primarily, it is essential that the composite strip 6 be provided for employment with the various molding means shown, and a simple construction of the said strip is illustrated in Fig. 4 and comprises two longitudinal overlapping strips 7 and 8, each of which is a trapezoid in cross section and with the oblique faces of the strips contacting and preferably uniting so that the entire composite strip 6 is of an integral structure. The strip is made up of porcelain material, such as employed in the manufacture of artificial teeth and is essentially composed of felspar with more or less coloring matter and a slight admixture of a suitable binder sufficient to hold the felspar in definite form both in the bar shape and when stamped up into the tooth forms preliminary to the ultimate vitrification under high temperature. In the particular construction shown, the material 8 of the strip is relatively lighter than the material 7, the latter being intended to form the main body and back of the tooth but blending into the lighter material 8 at what constitutes the upper or root end of the tooth, whereas the lighter material 8 overlaps the darker material 7 to constitute the lighter and more transparent portion of the incisor end of the tooth as well as a large portion of the frontal surface, as will be more fully understood by explanations hereinafter to be given. For convenient employment in connection with stamping or pressing dies, it is desirable that the composite strip be made sufficiently plastic that it will maintain its continuity while being stamped in the dies when forming the tooth forms.

The improvements of the present application reside in an organized machine for forming tooth forms of the plastic material in an accurate and speedy manner to duplicate what may be accomplished with the use of ordinary molds when carrying out my improved process under a more generic understanding as embodied in my aforesaid application Serial Number 558,069, filed May 3, 1922, of which the present application is a division. To secure a better understanding of the purpose of my improved apparatus, I will first describe the process involved when carried out with the ordinary dies in the molding of the tooth forms.

In employing the ordinary mold parts 2 and 3 shown in Fig. 1 for use with my improved method, I may place the composite strips 6 between the tooth mold parts 4 and 5, and thereupon force the mold parts 2 and 3 together, with the result that portions of the strips 6 are caused to fill the tooth form spaces between the said parts 4 and 5, giving to the material the tooth shape desired. In this operation, the body part 3, in effect, acts as a die to stamp from the strip a sufficient quantity thereof to fill the mold parts 4 and 5, when they are finally brought together, as indicated more fully in Fig. 2, and producing thereby the tooth structure shown in Fig. 3. It will be understood, however, that the particular shape of the tooth is a mere result of the particular shape of the recesses 4 and 5 and, therefore, while I have indicated a shape to correspond to the tooth structure of Fig. 3, I do not in any manner restrict myself to the shape of the molding parts, as they may be made of any shape which may be required to produce porcelain teeth or other objects.

By further reference to Fig. 1, it will be observed that the overlapping light and dark felspar materials of the strip are so received in the mold parts 4 and 5 that the dark material fills the larger portion of the recess 4 to constitute the dark body portion 7$^a$ of Fig. 3, whereas the lighter portion 8 of the strip more fully fills the recess 5 of the mold to form the light shade front portion 8$^a$ of the tooth structure and the incisor end 8$^b$ thereof, as indicated in Fig. 3. Furthermore, it will be seen that the root end or that which comes next to the gums, shown at 7$^b$, is formed of the darker material constituting the body part 7$^a$. When the biscuited tooth thus molded is subjected to the vitrifying temperature, the feldspars 8$^a$ and 7$^a$ weld into each other and the coloring or shading more or less blends and especially toward the end 7$^b$ where the overlapping of the two materials extends to the front surface. I would further point out that in molds of this character there is provided a recess 9 in the mold part 2 which may receive a pin 10 to be directly molded into the tooth structure, as indicated in Fig. 3, the porcelain material being molded about the upwardly projecting head portion of said pin. Pins of this character are usually employed in facings. If the pin is double headed, as some times employed, then the tooth is adapted for use in plate work in which the exposed head portion would be embedded in the vulcanite. In some types of teeth, the pins are soldered into anchors after the teeth have been completed. In those cases, the anchors are supported upon posts which project upwardly from the recesses 9 in the mold part 2, and the anchors are supported on the ends of the posts so that when the porcelain material is molded over the anchors and subsequently removed from the molds, the anchors remain in the molded tooth, and when the same is vitrified said anchors are firmly in position and form a support for the pins which are subsequently soldered thereto, such method of attaching the pins to anchors by solder being well known, and no further reference to it will be necessary.

The purpose and manner of manipulating the composite strip will now be understood and it is to accomplish these same results in a more rapid and accurate and economical manner that my improvements now to be described are intended.

Referring to Fig. 5, I have indicated my invention as requiring two revolving cylindrical wheels $2^a$ and $3^a$ having in their coacting surfaces recessed portions constituting molding or die parts $4^a$ and $5^a$ respectively, and between these wheels $2^a$ and $3^a$ I feed the composite strip 6 and in that manner mold the tooth forms, as will be readily understood. In a machine of this character, the molding operation may be performed very rapidly and it will also be understood that the different recesses $4^a$ and $5^a$ may be variously shaped so that one revolution of the wheel $3^a$ may mold a complete set of twelve teeth constituting the frontal teeth of the upper and lower jaw.

Referring to Fig. 6, I have shown lower and upper dies $2^c$ and $3^c$ respectively, having vertical reciprocating motions in stationary portions 13 and 14 of the main frame. These dies may be reciprocated by any suitable mechanism, as will be understood by one skilled in the art, and have their opposing surfaces $4^c$ and $5^c$ so shaped that they cooperate to form a mold space corresponding to the form of tooth to be molded. The main frame 13 is provided with a table portion 12 which is continuous across the dies $2^c$ and $3^c$ and a space 6 is provided between the table portion 12 and the portion 14 of the main frame between which the composite strip 6 may be fed in an intermittent manner so that, as it passes between the dies $2^c$ and $3^c$, the latter may be operated to punch from the said strip the material necessary to form the molded tooth structure. The shape of the die portions $4^c$ and $5^c$ are such as to produce a tooth form of the general character of Fig. 3. In the operation of these dies, the lower die $2^c$ may be held stationary while the upper die $3^c$ is caused to descend stamping from the strip 6 the necessary material to form the molded tooth. When the tooth is thoroughly molded and fully compressed, the lower die descends to the position indicated by dotted lines, whereat the molded tooth form may be removed from the die by a blast of air or otherwise, as may be desired. If the dies are operated in a horizontal direction, it is manifest that the tooth form will drop out from the die when brought to the dotted line position, where it may fall by gravity. I do not limit myself to these details as to the mode of operation in so far as they may relate to the specific form of apparatus. In cases where a pin is to be molded into the tooth, the die part $2^c$ is provided with an oblique channel or hole 18 in which is guided a tubular plunger 16 having operatively arranged within the same a plunger rod 17. In receiving and introducing a pin into the mold, the tubular plunger 16 and the rod 17 are lowered to a position which enables one of the pins 10 from the race-way 19 to pass into the end of the tubular plunger and thereupon the plunger is raised to the level of the bottom of the mold surface $4^c$, as shown in Fig. 6, and the plunger rod 17 then raised to an extent sufficient to raise the pin so that its head extends somewhat into the mold space as in the case of Fig. 1, and while in this position and thus supported the upper die $3^c$ descends to mold the porcelain material about the said pin, so that the result is similar to that indicated in the operation with the mold parts shown in Fig. 1. However, in this case, the compression of the material is far greater and consequently there will be less shrinkage in the material when it is ultimately vitrified and, moreover, the tooth structure will be more dense and strong. When the die $2^c$ is moved down to the dotted position for discharge of the molded tooth form, the latter may be discharged by the rod 17 being driven forward to an extent sufficient to push the pin shank out of the tubular plunger 16. In cases where the molded tooth is to have an anchor instead of a pin, then and in that event, the parts 16, 17, are slightly modified as to adjustment for receiving and introducing an anchor within the mold space. In this case, the rod 17 would project somewhat beyond the tubular plunger 16 to support the anchor and then when the parts are driven upward, the anchor would be introduced into the mold space and supported upon the end of the rod 17 until the molding operation was completed. Thereafter, when the die $2^c$ is lowered, the plunger 16 would be moved forward to push the molded tooth together with its anchor off the end of the rod 17, thereby leaving the tooth with an anchor in it and a hole leading to the anchor, such as shown in Fig. $3^a$, in which $10^a$ is the anchor and $10^b$ is the hole.

While I have had in mind more particularly the manufacture of artificial teeth by my improved apparatus, it is to be understood that the same may be employed in the production of cameos, in which case the cross sectional forms of the parts 7 and 8 may be more or less varied. In such cases, the overlapping of the two characters of material 7 and 8 may each be of the full width of the composite strip, such, for example, as providing a dark backing of the full width with a thin surface layer of the lighter material also the full width, the surface of the upper die being shaped or formed to make the proper intaglio or relief impressions. In the case of cameo production, the vitrification may also be carried out by subsequent treatment to high temperature, and such cameo effects may be utilized either for jewelry or for buttons, etc.

In this application, I make no claim to the composite strips of material to be subjected to the forming operation, as the same forms subject matter of my application Serial Number 659,072, filed August 24, 1923. Neither do I claim the process or method involved in the making of the tooth or other forms, as the same forms subject matter of my application Serial Number 558,069, filed May 3, 1922, of which this application is a division.

I have described my improvement in that particularity which I deem to be the best exposition of my invention, and that which I prefer in commercial practice, but I do not restrict or confine myself to the minor or secondary details, as such are susceptible of modification which may be resorted to as matters of mechanical skill and without a departure from the spirit of the invention.

Having now described my invention, what I claim as new and desire to secure by Letters Patent is:

1. Apparatus for forming pressed composite materials, which consists in a pair of dies having a relative motion one with respect to the other and forming between them a mold space, a frame for supporting the dies so as to cause them to properly cooperate and also providing a horizontal guiding means for guiding a strip of material between the dies, one of said dies provided with means for inserting and supporting anchoring devices in the mold space whereby they are arranged to be embedded within the material compressed between the dies.

2. The invention according to claim 1, wherein further, the means for supporting the anchoring devices is movable with one of the dies and reciprocable thereon, whereby it may bodily move with the die and at the same time be capable of having an independent motion relatively thereto.

3. The invention according to claim 1, wherein further, the die elements are reciprocable relatively toward and from each other and the means for inserting and supporting the anchoring devices comprises a channel extending longitudinally through one of the dies, means to feed the anchoring devices to the channel in succession, and a reciprocating plunger for feeding the anchoring devices through the channel and sustaining them in position so that they extend into the mold space whereby they may be embedded in the molded material when the dies are brought together.

4. The invention according to claim 1, wherein further, the die elements are reciprocable relatively toward and from each other and the means for inserting and supporting the anchoring devices comprises a channel extending longitudinally through one of the dies, means to feed the anchoring devices to the channel in succession, and a reciprocating plunger for feeding the anchoring devices through the channel and sustaining them in position so that they extend into the mold space whereby they may be embedded in the molded material when the dies are brought together, and a reciprocable tubular lining to the channel and surrounding the plunger whereby the anchoring devices may be raised through the channel preliminary to their support in the mold space by the plunger.

5. The invention according to claim 1, wherein further, the die elements are reciprocable relatively toward and from each other and the means for inserting and supporting the anchoring devices comprises a channel extending longitudinally through one of the dies, a tubular member reciprocable in the channel and adapted to raise an anchoring device having an annular rim to the mold space in the die and to seal the channel through which the anchoring device passes, means to feed anchoring devices successively into the channel in line with the tubular member and a plunger reciprocable through the tubular member and adapted to support the anchoring device so that its annular shoulder portion is sustained in the mold space between the dies.

In testimony of which invention, I hereunto set my hand.

ALBERT E. GIBSON.